United States Patent
Ishikawa et al.

(10) Patent No.: US 10,782,392 B2
(45) Date of Patent: Sep. 22, 2020

(54) SCANNING OPTICAL SYSTEM AND LIGHT PROJECTING AND RECEIVING APPARATUS

(71) Applicant: KONICA MINOLTA, INC., Chiyoda-ku (JP)

(72) Inventors: Ryouta Ishikawa, Chiyoda-ku (JP); Shoji Kogo, Chiyoda-ku (JP)

(73) Assignee: Konica Minolta, Inc., Tokyo (JP)

(*) Notice: Subject to any disclaimer, the term of this patent is extended or adjusted under 35 U.S.C. 154(b) by 289 days.

(21) Appl. No.: 15/518,175

(22) PCT Filed: Oct. 6, 2015

(86) PCT No.: PCT/JP2015/078327
§ 371 (c)(1),
(2) Date: Apr. 10, 2017

(87) PCT Pub. No.: WO2016/056545
PCT Pub. Date: Apr. 14, 2016

(65) Prior Publication Data
US 2017/0307737 A1    Oct. 26, 2017

(30) Foreign Application Priority Data
Oct. 9, 2014  (JP) .................. 2014-207855

(51) Int. Cl.
*G01S 7/48*     (2006.01)
*G01S 7/481*    (2006.01)
(Continued)

(52) U.S. Cl.
CPC .......... *G01S 7/4817* (2013.01); *G01S 7/4815* (2013.01); *G01S 17/10* (2013.01); *G01S 17/42* (2013.01);
(Continued)

(58) Field of Classification Search
CPC ............ G01S 7/481; G01S 17/93; G01S 17/42
See application file for complete search history.

(56) References Cited

U.S. PATENT DOCUMENTS 4,733,072 A * 3/1988 Lettington ............ G01S 7/4817
                                                         250/235
5,028,103 A * 7/1991 Fukasawa ............... G02B 5/09
                                                         250/578.1
(Continued)

FOREIGN PATENT DOCUMENTS

JP        50-109737     8/1975
JP        63-311320     12/1988
(Continued)

*Primary Examiner* — Luke D Ratcliffe
(74) *Attorney, Agent, or Firm* — Cozen O'Connor

(57) ABSTRACT

A scanning optical system, includes a mirror unit having a first mirror surface and a second mirror surface which incline to a rotation axis; and a light projecting system having a light source. A light flux emitted from the light source is reflected on the first mirror surface of the mirror unit, thereafter, reflected on the second mirror surface, and then, projected so as to scan in a main scanning direction onto an object in accordance with rotation of the mirror unit. The light flux emitted from the second mirror surface becomes a plurality of spot lights on the object side, and the plurality of spot lights are arranged along a direction intersecting with the main scanning direction.

7 Claims, 13 Drawing Sheets

(51) Int. Cl.
*G02B 26/10* (2006.01)
*G02B 26/12* (2006.01)
*G01S 17/42* (2006.01)
*G01S 17/10* (2020.01)

(52) U.S. Cl.
CPC .......... *G02B 26/10* (2013.01); *G02B 26/105* (2013.01); *G02B 26/12* (2013.01); *G02B 26/123* (2013.01); *G02B 26/124* (2013.01)

(56) References Cited

U.S. PATENT DOCUMENTS

| | | | |
|---|---|---|---|
| 5,268,565 A * | 12/1993 | Katoh | G02B 5/09 235/462.31 |
| 2009/0195848 A1 | 8/2009 | DeBenedictis et al. | |
| 2016/0047902 A1 * | 2/2016 | Ishikawa | G01S 7/4817 356/4.01 |

FOREIGN PATENT DOCUMENTS

| | | |
|---|---|---|
| JP | 2011-511326 | 4/2011 |
| JP | 2014-006110 | 1/2014 |
| WO | WO 2014/168137 | 10/2014 |
| WO | WO 2015/122095 | 8/2015 |

* cited by examiner

SPOT ROTATION ANGLE (a)

(b)

LONGITUDINAL DISTORTION

LONGITUDINAL DISTORTION

SPOT ROTATION

SCANNING OPTICAL SYSTEM AND LIGHT PROJECTING AND RECEIVING APPARATUS

RELATED APPLICATIONS

This is a U.S. National Phase Application under 35 USC 371 of International Application PCT/JP2015/078327 filed on Oct. 6, 2015.

This application claims the priority of Japanese application no. 2014-207855 filed Oct. 9, 2014, the entire content of which is hereby incorporated by reference.

TECHNICAL FIELD

The present invention relates to a scanning optical system suitably used for a light projecting and receiving apparatus which irradiates a laser light flux and the like so as to detect an object and to a light projecting and receiving apparatus.

BACKGROUND ART

In recent years, in the fields, such as vehicles, security robots, unmanned helicopters, and the like, demands to perform obstacle detection in a proceeding direction accurately for the purposes of collision prevention, have been increasing. As methods of detecting obstacles, laser radars which are distance measuring apparatuses utilizing optical scanning, have been known. General laser radars are configured to rotate or oscillate a mirror, a polygon mirror or the like while projecting light fluxes emitted from a laser light source onto the mirror, the polygon mirror, or the like so as to scan a wide range and to receive scattered light rays from a light-projected object with a light receiving element, thereby performing shape measurement and distance measurement.

PTL 1 discloses a technique with regard to a polygon mirror which includes the even number of planar reflective surfaces and performs scanning by reflecting light rays the even number of times.

CITATION LIST

Patent Literature

PTL 1: JP S50-109737A

SUMMARY OF INVENTION

Technical Problem

By the way, in the case where an object located at a distant place is made to a measurement object with a laser radar, as the density of laser light fluxes irradiated to the object is higher, the light amount of the reflected light fluxes increases. Accordingly, it becomes possible to acquire the shape of the object and a distance to the object with sufficient accuracy. On the other hand, if light fluxes emitted from a laser light source are narrowed via an optical element etc., the density of the light fluxes can be increased. However, the irradiated spot diameter becomes smaller correspondingly to it, a range capable of being measured at one time becomes narrow, and a measurement efficiency lowers. Namely, on the assumption that the emission intensity of a laser light source is limited, it can be said that the density of light fluxes and measurement efficiency generally become a relationship of trade-off. On the other hand, there is also a request to measure an object in a wide range as much as possible. However, a polygon mirror disclosed in PTL 1 is originally used for scanning a screen of television images, etc., and a technique to solve the above-mentioned problems concerning the radar has not been disclosed.

The present invention has been achieved in view of the above-mentioned circumstances, and an object of the present invention is to provide a scanning optical system which can obtain a reflected light flux with sufficient intensity to a measurement object in a wide range, and a radar.

Solution to Problem

In order to realize at least one of the object mentioned above, a scanning optical system reflecting one aspect of the present invention, includes:

a mirror unit equipped with a first mirror surface and a second mirror surface each of which inclines to a rotation axis; and a light projecting system including at least one light source to emit a light flux toward the first mirror surface, wherein a light flux emitted from the light source is reflected on the first mirror surface of the mirror unit, thereafter, reflected on the second mirror surface, and then, projected so as to scan in a main scanning direction onto an object in accordance with rotation of the mirror unit, and wherein the light flux emitted from the second mirror surface becomes a plurality of spot lights on the object side, and the plurality of spot lights are arranged along a direction intersecting with the main scanning direction.

According to this scanning optical system, since a light flux emitted from the light source is reflected twice on the first mirror surface and on the second mirror surface, it becomes possible to project a light flux in which a change in a rotation angle of a spot light is less likely to occur in a scanning range. Therefore, it is possible to maintain a state where the plurality of spot lights reflected on the second mirror surface are aligned along the direction intersecting with the main scanning direction on the object side regardless of a position in the main scanning direction. Accordingly, it becomes possible to project a light flux for an object in a wide range by one time scanning while suppressing omission (missing) of measurement.

Advantageous Effects of Invention

According to the present invention, it becomes possible to provide a scanning optical system which can obtain a reflected light flux with sufficient intensity to a measurement object in a wide range, and a radar.

DESCRIPTION OF EMBODIMENTS

In the following description, a main scanning angle means an azimuthal angle of the center of a rotation axis of a projected light flux deflected by a mirror unit; a sub-scanning angle means an elevation/depression angle of a projected light flux with reference to a plane, made as a standard, orthogonal to a rotation axis; a spot rotation angle means an angle of the orientation of a light flux rotating around a light projecting direction serving as a rotation center; and longitudinal distortion means a deviation of an angle in the sub-scanning direction at the time of scanning a periphery with respect to an angle in the sub-scanning direction at the center of the main scanning direction.

Figure 1:
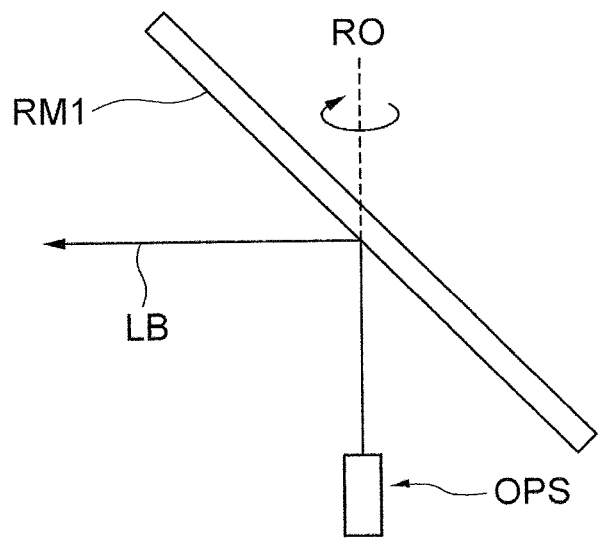
FIG. 1 is an illustration showing a scanning optical system of a comparative example.

Hereinafter, the present embodiment will be described with reference to the attached drawings. First, consideration is given to a comparative example where, as shown in FIG. 1, one reflective surface RM is inclined by 45 degrees to the rotation axis RO, and the reflective surface RM1 is rotated around the rotation axis RO while a light flux LB emitted from a light source OPS along the rotation axis RO direction is made to enter the reflective surface RM1. In this comparative example, it becomes possible to project the light flux LB over a certain angle range from the reflective surface RM1 without displacing the light source OPS. This operation is called scanning, and a direction in which the light beam LB moves in association with the rotation of the reflective surface RM1 is called a main scanning direction. Since the optical axis of the light source OPS (or a light projecting system including a light source OPS and a lens or a prism) and an optical path in the light projecting direction from the reflective surface RM1 can be made to intersect with each other, it is possible to project a light flux over a wide range.

Figure 2:
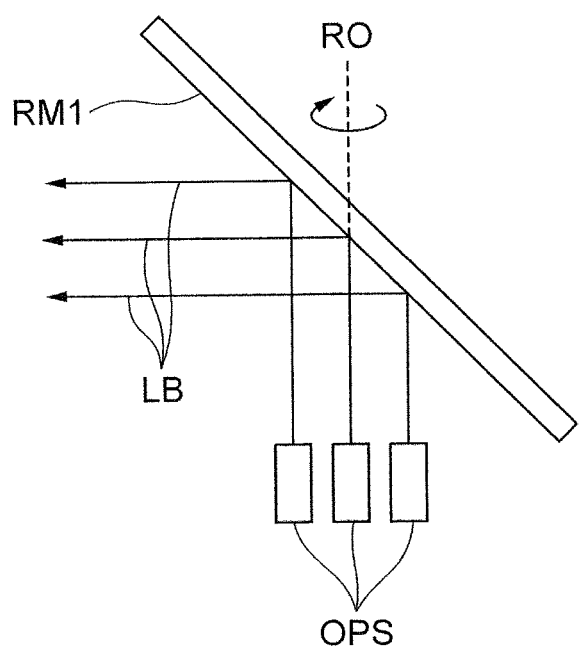
FIG. 2 is an illustration showing a scanning optical system of a comparative example.

In the case of using the reflective surface RM1 shown in FIG. 1, since the light flux LB moves continuously with respect to a main scanning direction, it becomes possible to scan a measurement object without omission, irrespective of the shape of a light flux. On the other hand, in the sub-scanning direction orthogonal to the main scanning direction, a range to which the light flux LB is projected by one time scanning is limited to the length of the light flux LB in the sub-scanning direction. Then, in order to expand a measurable range, it may be considered that a plurality of light fluxes proceeding toward a measurement object are arranged side by side in the sub-scanning direction. For example, as shown in FIG. 2, in the case where a plurality of light sources OPS are arranged such that their respective optical axes are located in a plane passing a rotation axis RO and light fluxes are made to enter the reflective surface RM1 via a lens LS, by rotating this mirror unit MU around the rotation axis RO, three light fluxes LB reflected on the reflective surface RM1 are projected in a state of being arranged side by side in the direction of the rotation axis RO. With this, it becomes possible to emit light fluxes to a measurement range of a wide range by one time scanning.

Figure 3:
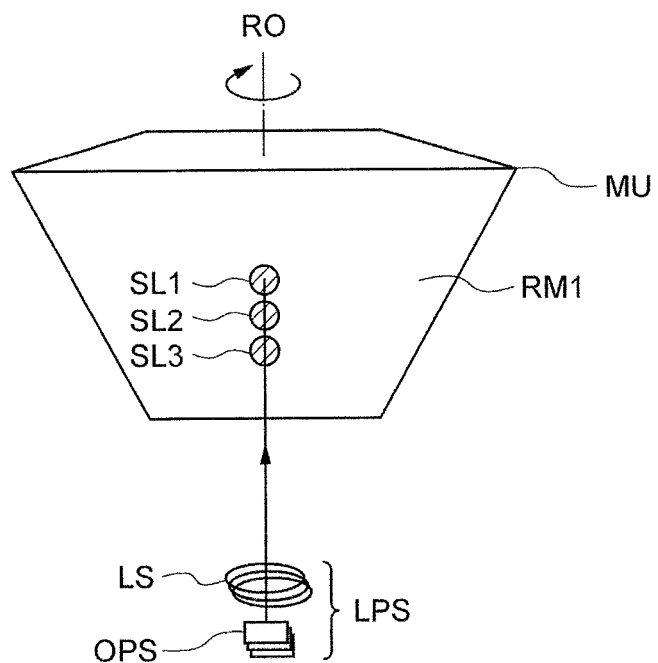
FIG. 3 is a schematic illustration showing a scanning optical system of a comparative example, and is a view seen from a front face.
Figure 4:
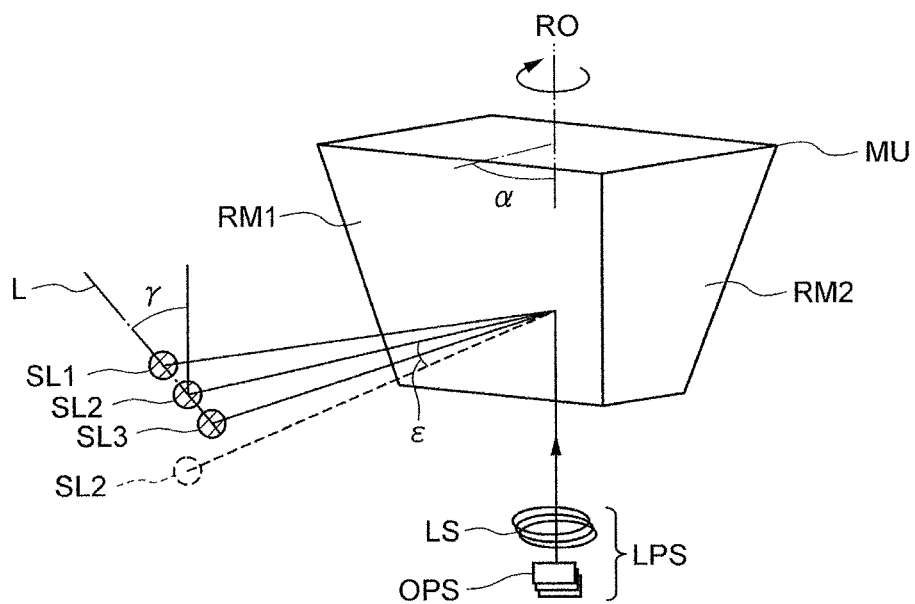
FIG. 4 is a schematic illustration showing a scanning optical system of a comparative example, and is a view showing a state where the scanning optical system rotates.

Incidentally, description is given to problems in the case where a plurality of light fluxes emitted from the light source is reflected only one time on a mirror surface and are made to proceed to a measuring object. FIGS. 3 and 4 show a scanning optical system of a comparative example, and the proceeding directions of the light fluxes are schematically illustrated. In the case of using the scanning optical system in which laser light fluxes (hereinafter, referred to as spot lights) emitted from a light projecting system LPS including a plurality of light sources are reflected only one time, and then, are made to proceed to a measurement object, problems described below occur. In FIG. 3, a mirror unit MU which includes a reflective surface RM1 inclining relative to a rotation axis RO is being rotated around the rotation axis RO. Each of spot lights SL1 to SL3 emitted from three light sources OPS of the light projecting system LPS in the direction along the rotation axis RO is assumed herein to have a circular cross section. In FIG. 3, the spot lights SL1 to SL3 which are reflected on the reflective surface RM1 and advances toward an object, are made to proceed in the direction vertical to a sheet surface.

In the case where the mirror unit MU shown in FIG. 3 is rotated, spot lights SL1 to S13 reflected on the reflective surface RM1 proceed in the horizontal (right-to-left) direction as shown in FIG. 4. With this movement, the spot lights SL1 to S13 scan a range where a measurement object exists. However, spot rotation will occur. In concrete terms, the spot rotation means that a line L connecting the respective centers of the spot lights SL1 to S13 inclines relative to the rotation axis RO. The inclination angle • is called a spot rotation angle.

Moreover, in the case where the light fluxes emitted from the three light sources OPS enter the reflective surface RM1 in nonparallel to the rotation axis RO, longitudinal distortion also occurs (spot rotation differs from that in the case of entering in parallel). In concrete terms, in the longitudinal distortion, a spot light flux is distorted in the sub-scanning angle direction, and a gap between scanning lines becomes narrower or wider. That is, the longitudinal distortion represents a phenomena that a spot light flux SL2 exemplified in FIG. 4 shifts (indicated with a broken line) in an axial line direction of the rotation axis RO relative to a direction (indicated with a solid line) prospected to proceed originally. This shift amount is denoted with an angle deviation (•) in the sub-scanning angle direction.

Figure 5:
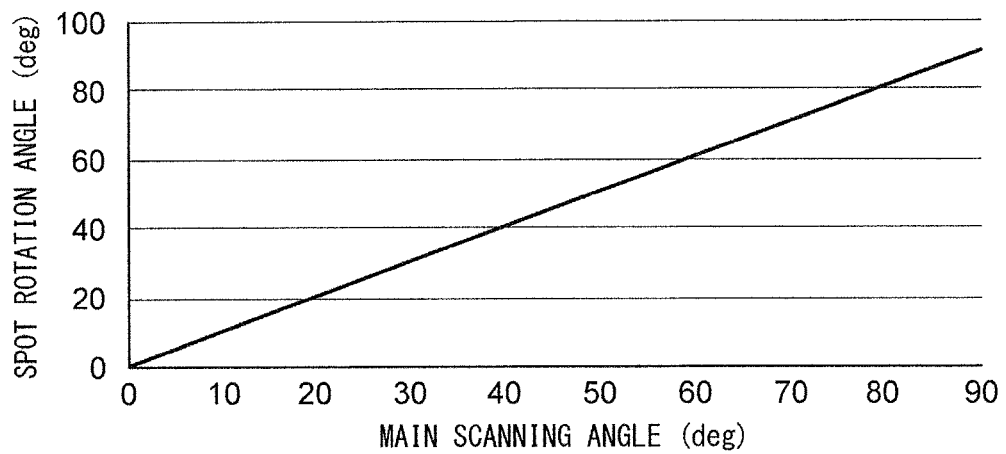
FIG. 5 is a graph showing a relationship between a main scanning angle and a spot rotation angle in a scanning optical system of a comparative example.

FIG. 5 is a diagram showing a relationship between a main scanning angle and a spot rotation angle in the case where a light flux is made to enter, in parallel to the rotation axis, a reflective surface inclining by 45 degrees relative to the rotation axis shown in FIG. 1. Here, in the case where a light flux is made to enter the reflective surface RM in parallel to the rotation axis, the main scanning angle becomes the same as the rotation angle. As shown in FIG. 5, as the rotation angle • of the reflective surface RM1 increases, the spot rotation angle • increases.

Figure 6:
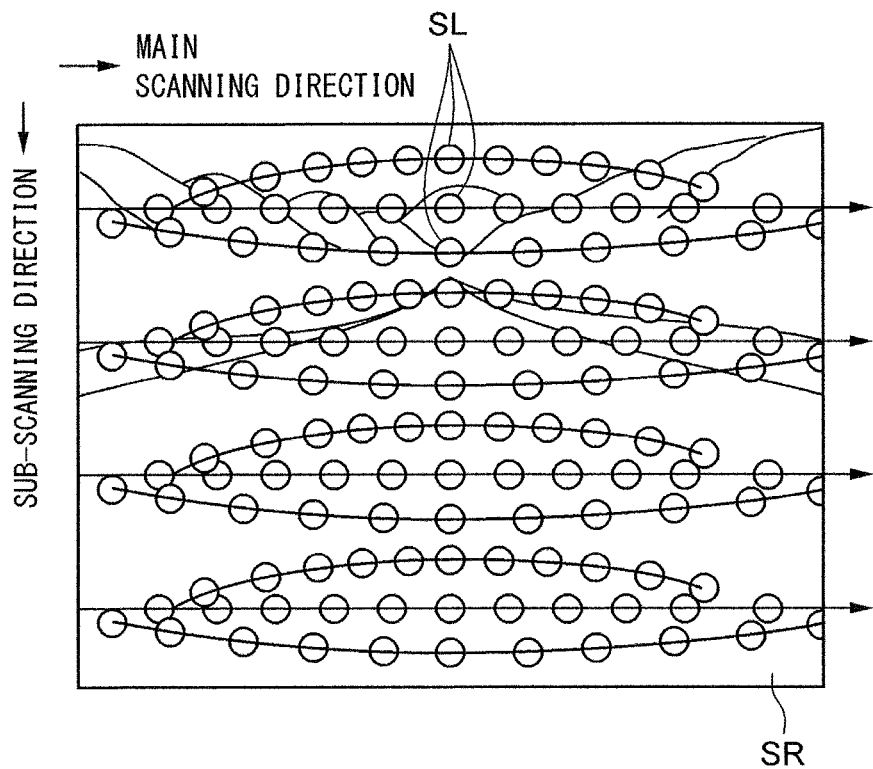
FIG. 6 is a diagram showing a situation where the inclination of a spot light flux projected onto a virtual plane including a measurement object from a scanning optical system of a comparative example changes depending on a position in a main scanning direction.

FIG. 6 is a diagram which shows a situation where the arrangement pattern of the plurality of spot lights projected onto a measurement object from such a scanning optical system varies depending on a position in the main scanning direction, and shows an example where a central locus (circular arc) of each of upper and lower spot lights is drawn by a one-dot chain line and each of spot lights is made to shift in the sub-scanning direction for every one scanning. Here, longitudinal distortion is ignored. In FIG. 6, a surface on which the spot lights SL are made to scan is called a scanning surface SR. As is clear from FIG. 6, in spot lights SL proceeding toward the center of the reflective surface RM1, a spot rotation angle • is 0 degree, and the spot lights SL are arranged orthogonally (longitudinally) relative to the main scanning direction. On the other hand, in spot lights SL proceeding toward a periphery of the reflective surface RM1, a spot rotation angle • increases. That is, as the spot lights SL proceed closer to the periphery, an inclination of the arrangement direction relative to the main scanning direction becomes small. With this, at the center of the scanning surface SR, a range capable of being covered by the main scanning of one time is wider in the sub-scanning direction. On the other hand, at the both ends of the scanning surface SR, a range capable of being covered by the main scanning of one time becomes narrower in the sub-scanning direction. Accordingly, there is a fear that omission of measurement (missing measurement) for an object may occur. For this reason, in the case of scanning a wide angle, a plurality of projected light fluxes cannot be arranged in the direction intersecting with the main scanning direction.

Figure 7:
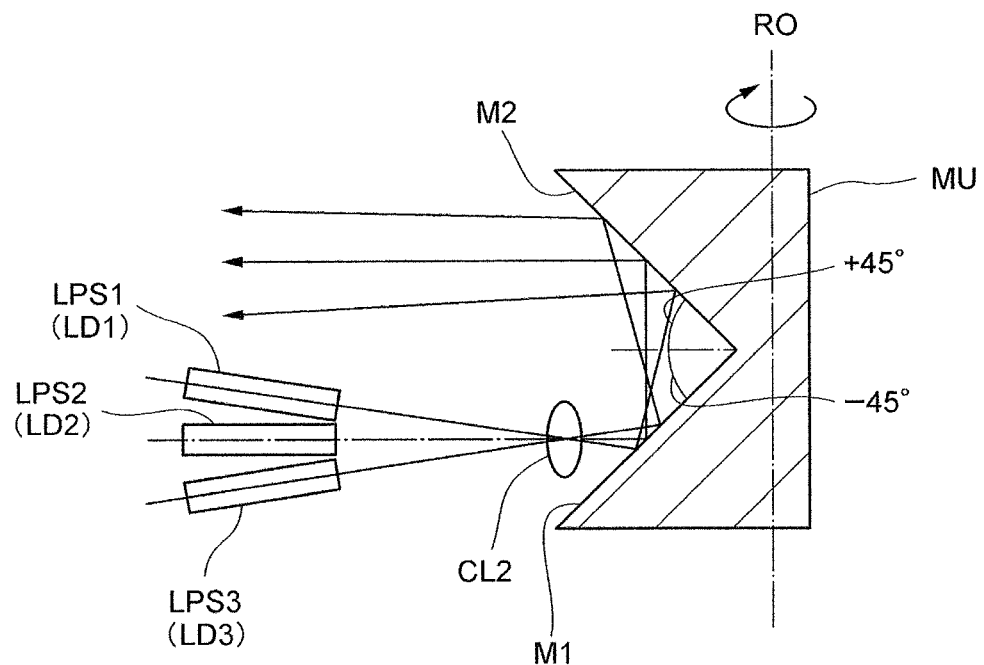
FIG. 7 is an illustration showing a scanning optical system according to the present embodiment by cutting it on a plane including a rotation axis.
Figure 8:
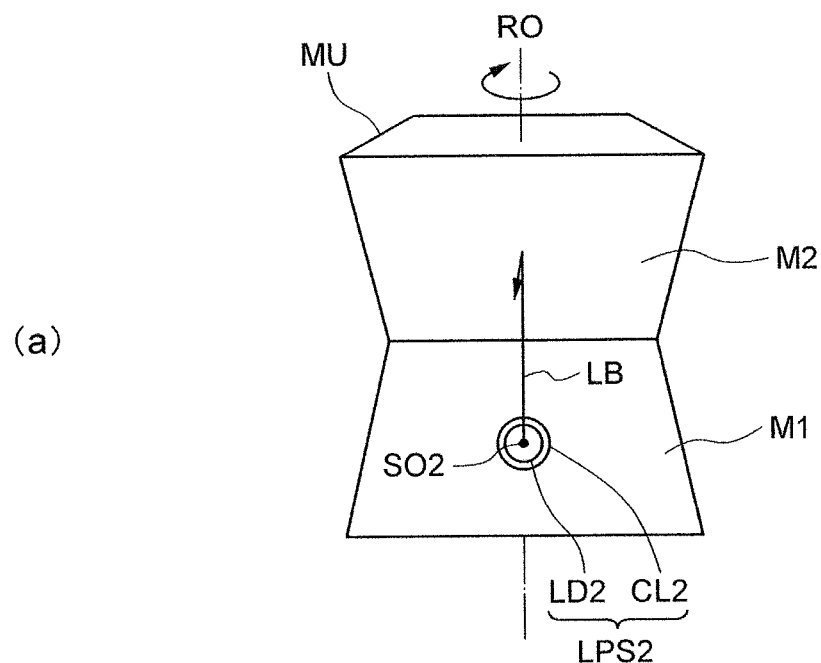
FIG. 8(a) is a front view of a scanning optical system according to the present embodiment.
FIG. 8(b) is a view seeing in the direction of a rotation axis and showing a state of the center of a main scanning angle.
Figure 8:
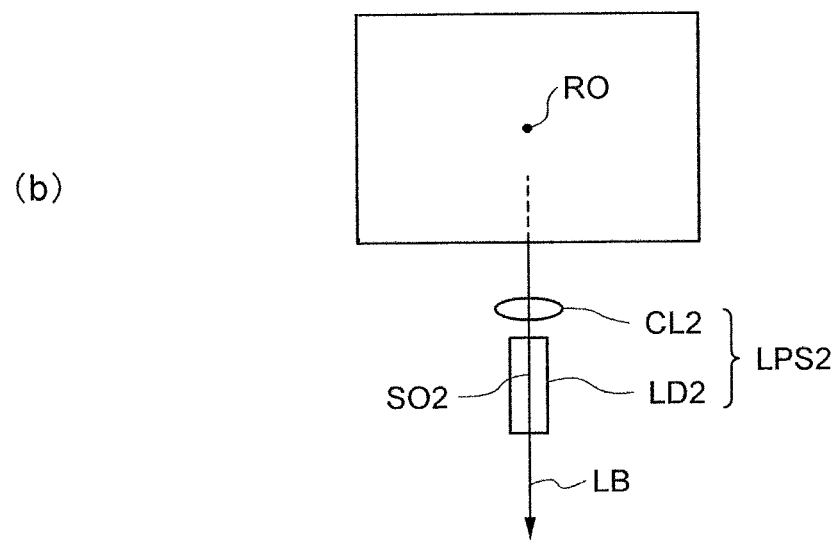
Figure 9:
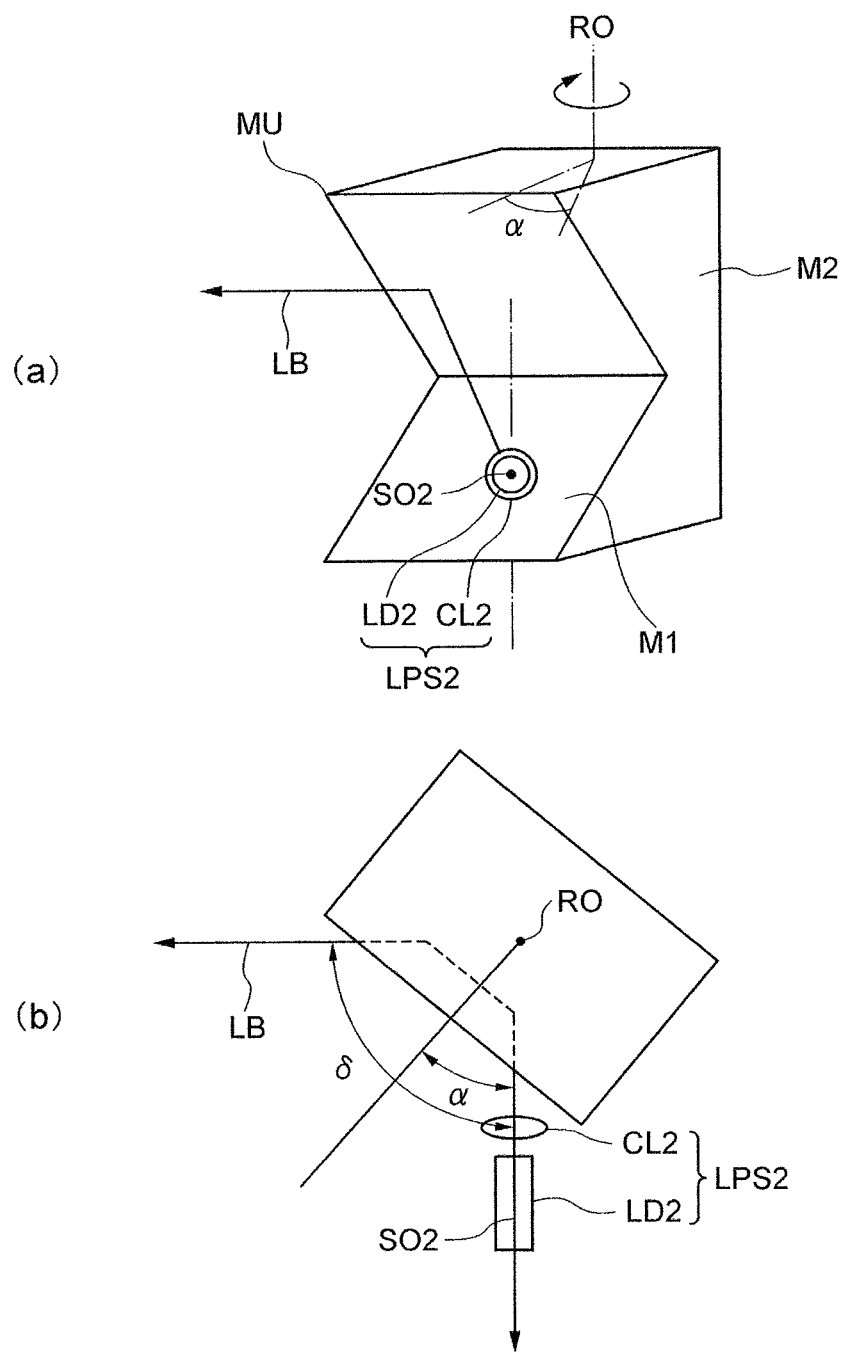
FIG. 9(a) is a front view of a scanning optical system according to the present embodiment.
FIG. 9(b) is a view seeing in the direction of a rotation axis and showing a state of the periphery of a main scanning angle.

Hereinafter, an embodiment of the present invention which solves the above problems will be described. FIG. 7 is a cross sectional view, along a rotation axis RO, showing a scanning optical system of the present embodiment. FIG. 8(a) is a front view of the scanning optical system of the present embodiment, and FIG. 8(b) is a view seeing in the direction of a rotation axis and showing a state of the center of the main scanning angle. FIG. 9(a) is a front view of a scanning optical system of the present embodiment, and FIG. 9(b) is a view seeing in the direction of a rotation axis and showing a state of the periphery of the main scanning angle. In FIGS. 8 and 9, for ease of understanding, only one light projecting system (LPS2) is shown. Here, the scanning optical system is constituted by the mirror unit MU and the light projecting systems LPS1 to LPS3. The cross section shape of a spot light flux orthogonal to the proceeding direction, is assumed to be similar to that in the comparative example.

As shown in FIG. 7, the light projecting systems LPS1 to LPS3 including semiconductor lasers LD1 to LD3 as light sources and a collimator lens CL are disposed in a plane passing the rotation axis RO relative to the rotation axis RO of a mirror unit MU including a first mirror surface M1 and a second mirror surface M2. At this time, the light projecting systems LPS1 to LPS3 are disposed on the first mirror surface M1 side relative to the apex, serving as a position reference, of an intersection angle formed by the first mirror surface M1 and the second mirror surface M2. Herein, the first mirror surface M1 is disposed so as to incline at an angle of −45 degrees from a flat plane orthogonal to the rotation axis RO relative to the optical axis direction of the light projecting system LPS2, and the second mirror surface M2 is disposed so as to incline at an angle of +45 degrees from a flat plane orthogonal to the rotation axis relative to the optical axis direction of the light projecting system LPS2.

As shown in FIG. 8, when the rotating position of the mirror unit MU becomes an angle at which the optical axis SO2 of the light projecting system LPS2 is located within a plane which includes the first mirror surface M1 and a normal line of the second mirror surface M2 (a state where the optical axis SO2 is oriented toward the center of the main scanning angle), the light flux LB emitted from the light projecting system LPS2 is reflected on the first mirror surface M1, proceeds in parallel to the rotation axis RO, and then, is reflected on the second mirror surface M2. Successively, the reflected light flux LB is projected from the second mirror surface M2 to an object. At this time, as shown in FIG. 8(a), in the case where the mirror unit MU is seen from the light projecting direction, the optical axis SO2 of the light projecting system LPS2 may be displaced to the right or the left from the rotation axis RO.

Furthermore, as shown in FIG. 9, in the case where the mirror unit MU is rotated only by a rotation angle • of 45 degrees from the center of the main scanning angle (a state shown in FIG. 8) around the rotation axis RO, a main scanning angle as a relative angle difference between a light flux LB after having been reflected on the second mirror surface M2 and a light flux LB immediately after having been emitted from the light projecting system (as shown in FIG. 9(b), when viewing from the rotation axis RO, an angle • formed by the optical axis SO2 of the light projecting system LPS2 and a light flux LB emitted from the mirror unit MU), becomes 90 degrees. Namely, it turns out that the main scanning angle (•=90 degrees) being two times the rotation angle (•=45 degrees) has been obtained. Although illustration is not made, it is similar to light fluxes emitted from the light projecting systems LPS1 and LPS3.

Figure 10:
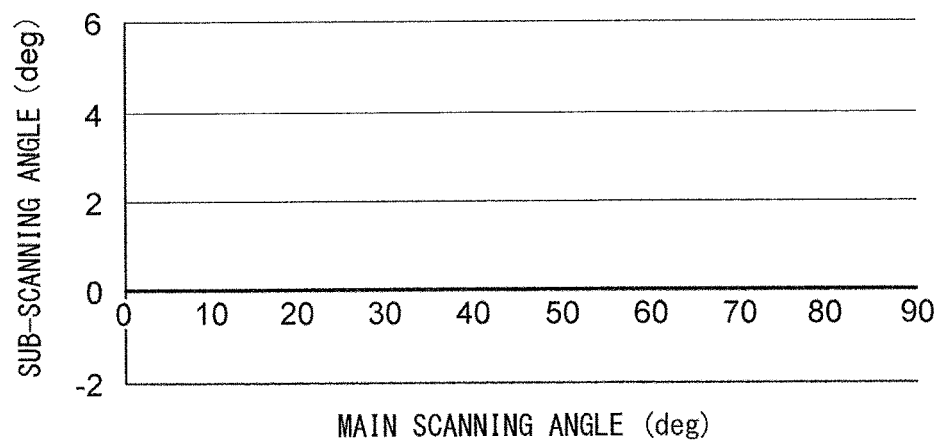
FIG. 10 is a graph showing longitudinal distortion of a scanning optical system according to the present embodiment.
Figure 11:
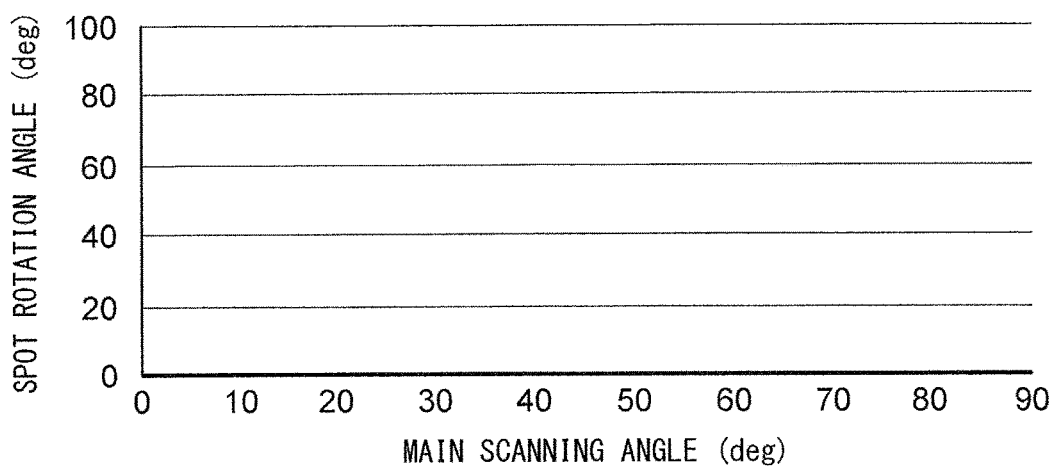
FIG. 11 is a graph showing a relationship between a main scanning angle and a spot rotation angle in a scanning optical system according to the present embodiment.

A relationship of longitudinal distortion (indicated with a sub-scanning angle) relative to the main scanning angle • in this case is shown in FIG. 10, and a relationship of a spot rotation angle relative to the main scanning angle • is shown in FIG. 11. In this way, in the case where an angle formed by the first mirror surface M1 and the second mirror surface M2 is 90 degrees, even if the main scanning angle • changes, neither longitudinal distortion nor the spot rotation angle changes. Thus, in addition to the light projecting system LPS2, spot lights formed by light fluxes emitted from the light projecting systems LPS1 and LPS3 can scan ideally while moving in parallel with the arrangement direction maintained relative to an object. Namely, it is shown that a spot rotation can be suppressed by reflecting a spot light flux two times on the first mirror surface M1 and the second mirror surface M2. The use of such a mirror unit MU makes it possible to realize a scanning optical system in which spot rotation is not caused on the entire region of the main scanning angle.

Figure 12:
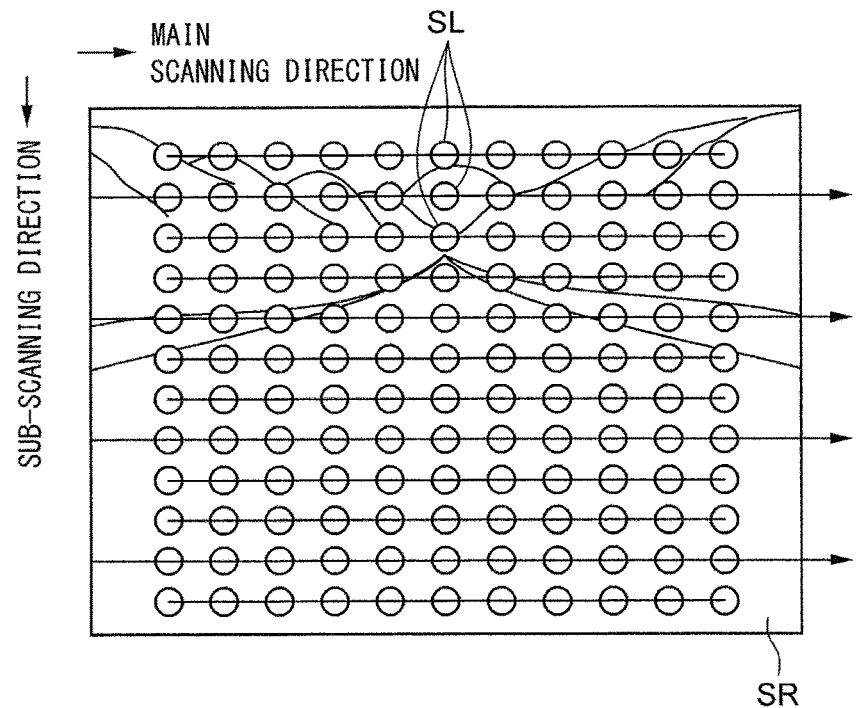
FIG. 12 is a diagram showing a situation where the inclination of a spot light flux projected onto a virtual plane including a measurement object from a scanning optical system according to the present embodiment does not change depending on a position in a main scanning direction.

FIG. 12 is a diagram showing a situation where the arrangement pattern of a plurality of spot lights projected to a measurement object from the scanning optical system according to the present embodiment does not change depending on a position in the main scanning direction. In this diagram, a central locus (a straight line) of each of upper and lower spot lights is drawn by a one-dot chain line, and an example including four sub-scanning directions is shown. In FIG. 12, a surface on which a spot light flux SL is made to scan is called a scanning surface SR. As is clear from FIG. 12, the arrangement direction of spot lights is always made almost orthogonal to the main scanning angle regardless of the main scanning angle. Accordingly, a measuring object which exists at any place on the scanning surface can be irradiated with light fluxes.

Next, the influence of longitudinal distortion is considered. In the case of actually using the mirror unit MU shown in FIG. 7 and so on in a radar, the sub-scanning angle of a measurement range may not be 0 degree, or an incident angle and a sub-scanning angle may not coincide with each other. Furthermore, there are the actual circumstances that since a length in the sub-scanning direction on a cross section orthogonal to the proceeding direction of a spot light flux is limited, a measuring range where an object exists is required to be divided in the sub-scanning direction. Therefore, it is desirable that a plurality of pairs of the first mirror surface and the second mirror surface are disposed on the mirror unit MU, and that an angle formed by the first mirror surface and the second mirror surface is shifted from 90 degrees for each pair such that light fluxes passing the respective mirror pairs are shifted separately in the sub-scanning angle direction so as to scan on the respective different positions in the sub-scanning angle direction.

Figure 13:
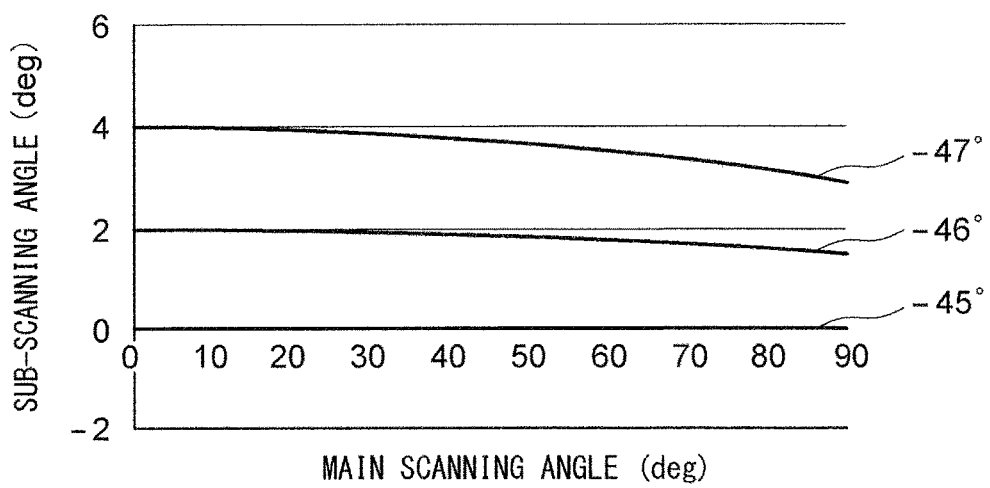
FIG. 13 is a diagram showing a relationship between a main scanning angle and longitudinal distortion in the case of changing the inclination angle of the first mirror surface M1.
Figure 14:
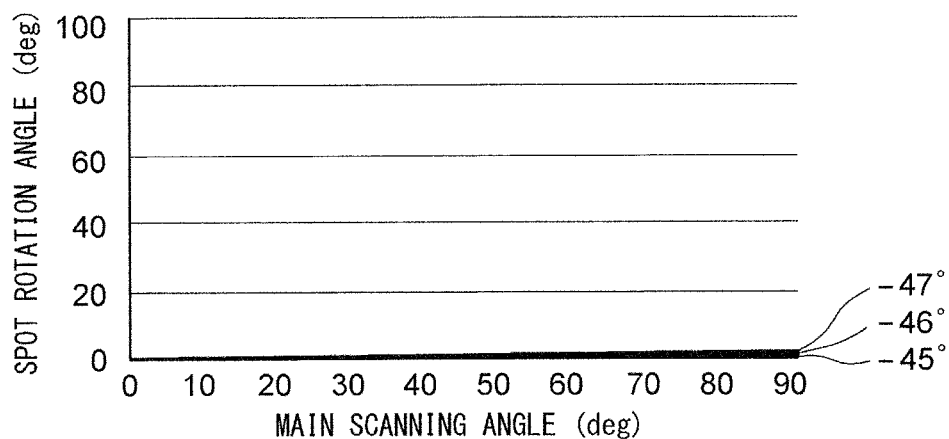
FIG. 14 is a diagram showing a relationship between a main scanning angle and a spot rotation angle in the case where of changing the inclination angle of the first mirror surface M1.

Here, examination is made for longitudinal distortion and spot rotation angle. In the case of changing the inclination angle of the first mirror surface M1, a relationship between a main scanning angle and longitudinal distortion is shown in FIG. 13. In the case of changing the inclination angle of the first mirror surface M1, a relationship between a main scanning angle and a spot rotation angle is shown in FIG. 14. In the case where the first mirror surfaces M1 are made to incline from the state shown in FIG. 7 by −45 degrees, −46 degrees, and −47 degrees respectively from a flat plane orthogonal to the rotation axis RO to the light projecting system side and all the second mirror surfaces M2 are made to incline in the reverse direction by 45 degrees, longitudinal distortion and a spot rotation angle are as shown in FIGS. 13 and 14. The longitudinal distortion becomes bilaterally symmetrical with respect to the center of the scanning angle and becomes substantially vertically symmetrical with respect to the center of the angle of 90 degrees formed by the first mirror surface M1 and the second mirror surface M2. In the case of changing an angle formed by the first mirror surface M1 and the second mirror surface M2, a degree of a change of each of the longitudinal distortion and the spot rotation changes. However, as can be seen from FIG. 13, since the longitudinal distortion is caused in a direction in which the respective scanning lines come close to each other, a gap has never been formed. The angle of each of the first mirror surfaces M1 and the angle of each of the second mirror surfaces M2 can be set arbitrarily. Moreover, it is not necessary to rotate at constant speed like a laser beam printer. In the case where a light flux is required to be projected only in a certain specific direction, it may be rotated by a required angle, and stopped, or it may be oscillated forward and backward.

In the case of projecting only a single light flux, it is necessary to use an angle deflecting device to incline a projected light flux in the sub-scanning direction, and it is required to perform scanning many times, which is not desirable. In the present embodiment, a measurable range can be expanded by projecting a plurality of spot lights, and spot rotation can be suppressed by using the above-mentioned mirror unit. Accordingly, the arrangement direction of spot lights can be aligned in the same direction in the light projecting range, whereby it becomes possible to project light fluxes to a wide range in the sub-scanning direction with one time scanning. Moreover, since longitudinal distortion is small, there is also a merit that it is less likely to cause a deviation in a light projecting angle in the sub-scanning direction on the center and the periphery. Moreover, symmetry relative to the center of the main scanning angle can be obtained for a spot rotation and longitudinal distortion. Accordingly, if the left main scanning angle and the right main scanning angle are the same, the spot rotation angle and the sub-scanning angle become equivalent to each other.

Herein, the term "a light flux emitted from the second mirror surface becomes, at the time of entering an object, a plurality of spot lights and the plurality of spot lights are arranged along a direction intersecting with the main scanning direction" means that even if a light flux is, at the time of being emitted from the light source, single, it is sufficient if the light flux is, at the time of entering an object, divided into a plurality of spot lights. Therefore, each of a case where each of a plurality of light fluxes emitted from a plurality of light sources is made to a spot light flux and a case where a light flux emitted from a single light source is made to pass a prism or a diffraction grating so as to be separated into a plurality of spot lights, is included. Furthermore, the term "a direction intersecting with the main scanning direction" means that an angle relative to the main scanning direction is not limited. However, in the case where such a direction is too close to the main scanning direction, the number of scanning lines is led to increase. Accordingly, it is preferable that the direction is inclined at an angle of ±45 degrees or more relative to the main scanning direction. More preferably, the direction is the sub-scanning direction inclined at an angle of 90 degrees. Moreover, the term "arranged" is not limited to arrange in one line, and, for example, it may be arranged in a staggered pattern.

The distance measurement (range finding) with a TOF (Time of flight) mode can be performed by using LED or laser, which performs pulse light emission, as a light source of the radar. As compared with conventional scanning optical systems which have been used for radars configured to use a TOF mode, since a change of resolving power is smaller in a wide main scanning angle, it is possible to provide a radar with a wide viewing angle usable effectively.

In the present embodiment, the light projecting system includes at least one light source (LD (Laser Diode), LED (Light Emitting Diode) or a fiber laser). In the case of using a single light source, an emitted light flux may be separated into a plurality of light fluxes via optical elements, such as a lens, a prism, and a diffraction grating. Furthermore, for example, even if light fluxes are, immediately after being reflected on the second mirror surface, superimposed on each other, it may be permissible if the light fluxes become, at the time of entering an object, a plurality of spot lights projected with the respective different angles in the sub-scanning direction. It is preferable that the light receiving system includes at least one optical element, such as CCD (Charge Coupled Device), CMOS (Complementary Metal-Oxide Semiconductor), or PD (Photo Diode), and collects light fluxes reflected from an object via optical components such as a lens, a mirror, and a prism such that information such as an object shape and a distance can be acquired.

Figure 15:
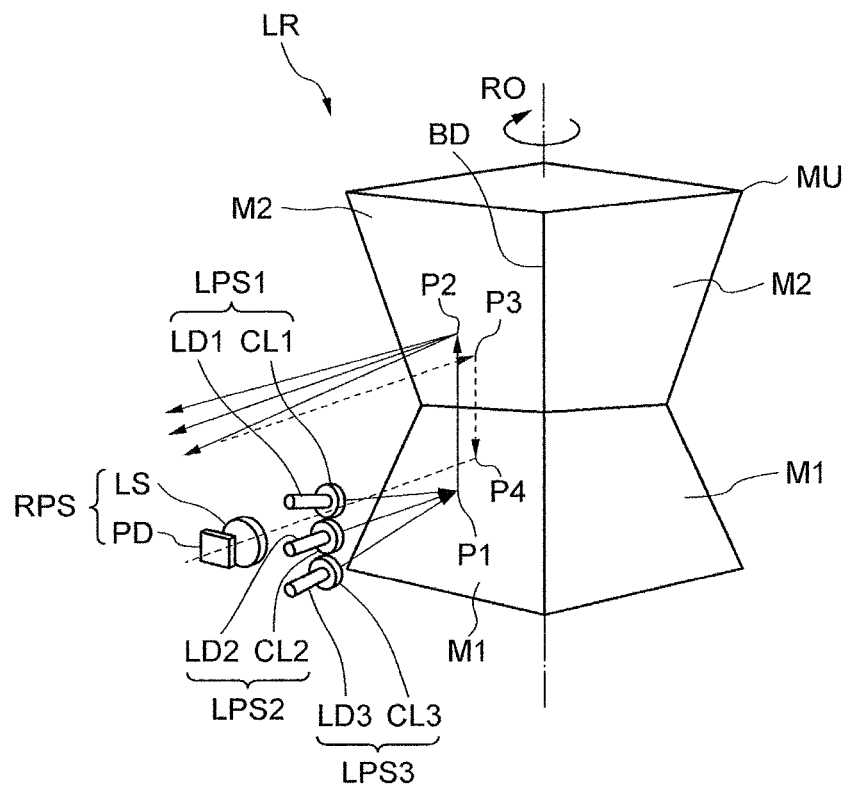
FIG. 15 is a schematic constitutional illustration of a laser radar LR according to the present embodiment.

FIG. 15 is a perspective view showing a schematic constitution of a laser radar LR according to the present embodiment, in which a shape and length of each of the constitutional elements may differ from the actual shape and length. The laser radar LR includes, for example, semiconductor lasers LD1 to LD3 as a light source, a collimator lens CL2 which converts diverging light fluxes from the semiconductor lasers LD1 to LD3 into parallel light fluxes, a mirror unit MU which projects each of the scanning laser light fluxes made to parallel light fluxes by the collimator lens CL2 toward an object side with a rotating reflective surface and reflects the reflected light flux from the object projected with the scanning laser light fluxes, a lens LS which collects the reflected light fluxes reflected on the mirror unit MU from the object, and a photo diode PD which receives the light fluxes collected by the lens LS.

The semiconductor lasers LD1 to LD3 and the collimator lens CL2 constitute the light projecting systems LPS1 to LPS3, and the lens LS and the photo diode PD constitute the light receiving system RPS. Herein, in the present embodiment, the photodiode includes a plurality of independent light receiving regions in the sub-scanning direction.

Figure 16:
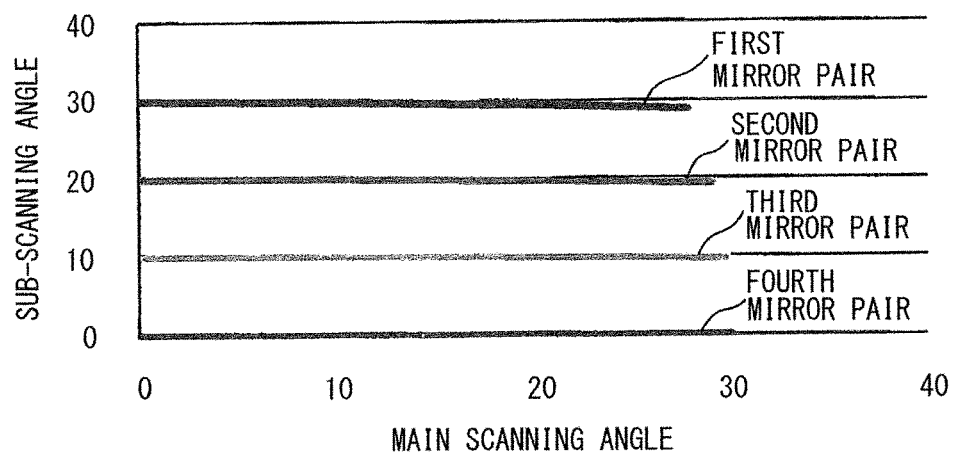
FIG. 16 is a diagram showing longitudinal distortion of a laser radar LR according to the present embodiment.
Figure 17:
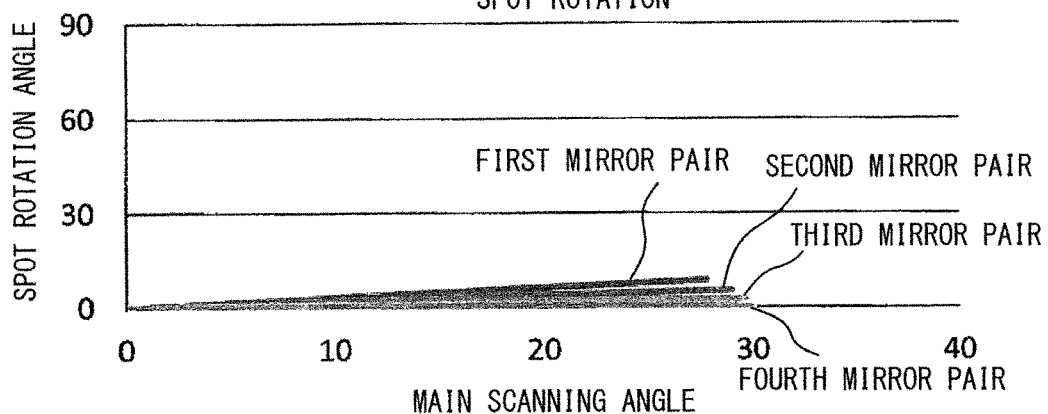
FIG. 17 is a diagram showing a spot rotation angle of a laser radar LR according to the present embodiment.

The approximately square tube-shaped mirror unit MU is made of resin, and is held so as to be rotatable around the rotation axis RO being an axis line. On its lower outer periphery, four trapezoid-shaped first mirror surfaces M1 are disposed, and so as to oppose them, on its upper outer periphery, four trapezoid-shaped second mirror surfaces M2 are disposed. An intersection angle between the first mirror surface M1 and the second mirror M paired vertically in each mirror pair is different from the respective intersection angles of the other mirror pairs. As one example, each of the first mirror surfaces M1 inclines by an angle of 45 degrees to an orthogonal plane to the rotation axis Ro, and the second mirror surfaces M2 incline toward the opposite sides by the respective angles of 60 degrees in the first mirror pair, 55 degrees in the second mirror pair, 50 degrees in the third mirror pair, and 45 degrees in the fourth mirror pair. In this case, longitudinal distortion becomes as shown in FIG. 16, and a spot rotation angle becomes as shown in FIG. 17. Each of the first mirror surface M1 and the second mirror surface M2 is covered with a reflective film by depositing, coating, or planting, or a metal polishing mirror or a film mirror by pasting.

The respective optical axes of the light projecting systems LPS1 to LPS3 are disposed in a plane passing the rotation axis RO of the mirror unit MU, and are inclined relative to each other. On the other hand, the optical axis of the light receiving system RPS is made orthogonal to the rotation axis RO of the mirror unit MU, and the light projecting systems LPS1 to LPS3 are disposed farther in the direction of the rotation axis RO than the light receiving system RPS. Here, the light projecting system LPS and the light receiving system RPS may be disposed in an arrangement reverse to that shown in the figure. Furthermore, in the case where a collimator lens is disposed for each of the semiconductor lasers LD1 to LD, the collimator lens CL2 may be omitted in an arrangement shown in the figure.

Next, a distance measurement operation of the laser radar LR is described. The three diverging light fluxes intermittently emitted in a pulse shape from the semiconductor lasers LD1 to LD3 are converted into parallel light fluxes by the collimator lens CL2. Then, the parallel light fluxes are made to enter the first mirror surface M1 of the rotating mirror unit MU, are reflected on there, further reflected by the second mirror surface M2, and are projected as three spot lights so as to scan toward an object (not shown) side.

The four combinations of the first mirror surface M1 and the second mirror surface M2 in the mirror unit MU have the respective four different kinds of intersection angles. Accordingly, when the mirror unit MU rotates once, it becomes possible to scan four different sub-scanning directions on the object side. With reference to FIG. 12, a laser light flux is reflected sequentially on the first mirror surface M1 and the second mirror surface M2 which are rotating and moving. At this time, first, a laser light flux reflected by the first mirror surface M1 and the second mirror surface M2 of the first pair is made to scan horizontally from the left to the right on the uppermost region on the scanning surface in response to the rotation of the mirror unit MU. Next, a laser light flux reflected by the first mirror surface M1 and the second mirror surface M2 of the second pair is made to scan horizontally from the left to the right on the second region from the top of the scanning surface in response to the rotation of the mirror unit MU. Hereafter, the scanning is repeated similarly, whereby the object side can be scanned two dimensionally.

Among the light fluxes projected for scanning, laser light rays which hit on an object and are reflected by it, enter again the second mirror surface M2 of the mirror unit MU as shown with a broken line in FIG. 15, are reflected on there, further reflected by the first mirror surface M1, collected by the lens LS, and detected by the light receiving surface of the photo diode PD, respectively. With this, the object can be detected.

Figure 18:
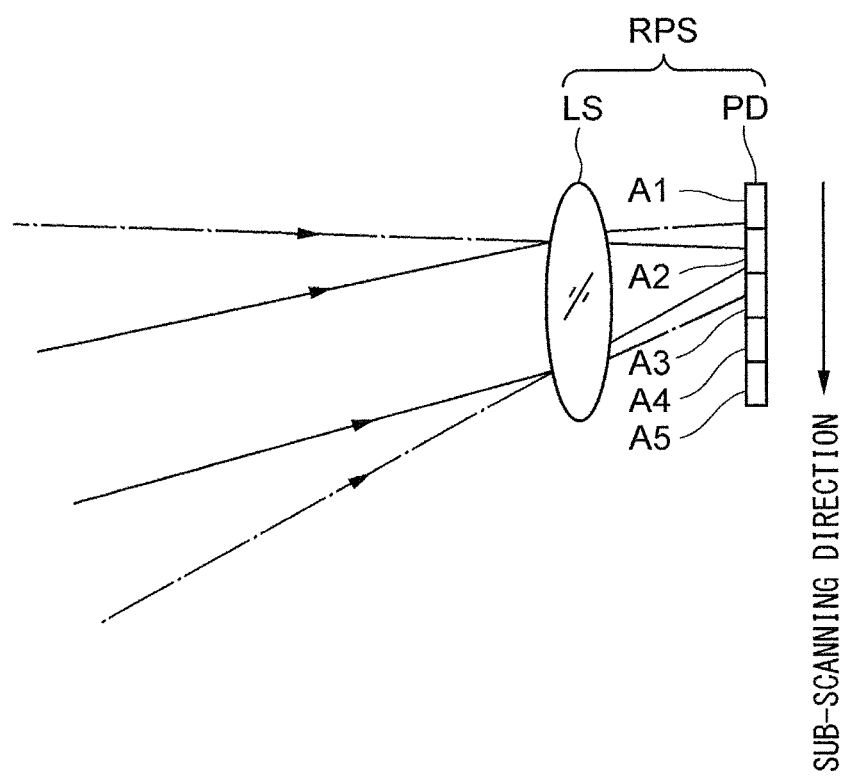
FIG. 18 is a schematic cross sectional view showing a light receiving system of a laser radar LR according to the present embodiment.

In the present embodiment, the photodiode PD being a light receiving element includes a plurality of independent light receiving regions in the sub-scanning direction so as to have a plurality of view fields, whereby resolution power can be raised. Herein, in the case where the cross section shape of a light flux emitted from a single light source is made longer in the sub-scanning direction, it is possible to expand a range being projected to an object per one scanning. However, in the case where a temperature change or an adjustment deviation occurs, the diameter of a light flux entering the photodiode PD increases, and an actual view field angle is expanded. Accordingly, cross talk occurs, and there is a fear that resolution power is made to lower. In FIG. 18, a one-dot chain line indicates a reflected light flux of a light flux which has a cross sectional shape made longer in the sub-scanning direction which is shown as a comparative example, and a solid line indicates a reflected light flux of a spot light flux according to the present embodiment. In the case of a light flux which has a cross sectional shape made longer in the sub-scanning direction, as shown in FIG. 16, the light flux is received across (cross talk) or over the light receiving regions A1 to A3. Accordingly, there is a feat that proper measurement cannot be performed.

According to the present embodiment, a plurality of spot lights are arranged side by side in the sub-scanning direction so as to divide a light projecting range in the sub-scanning direction. With this, even when a temperature change or an adjustment deviation occurs, a spot light flux is made to enter only any one of the independent light receiving regions A1 to A5 of the photodiode PD. As a result, it becomes possible to provide a laser radar which is strong for a temperature change and can perform adjustment easily. Herein, it is arbitrary to use a spot light flux with a cross section shape made longer in the sub scanning direction within a range where cross take does not occur.

Figure 19:
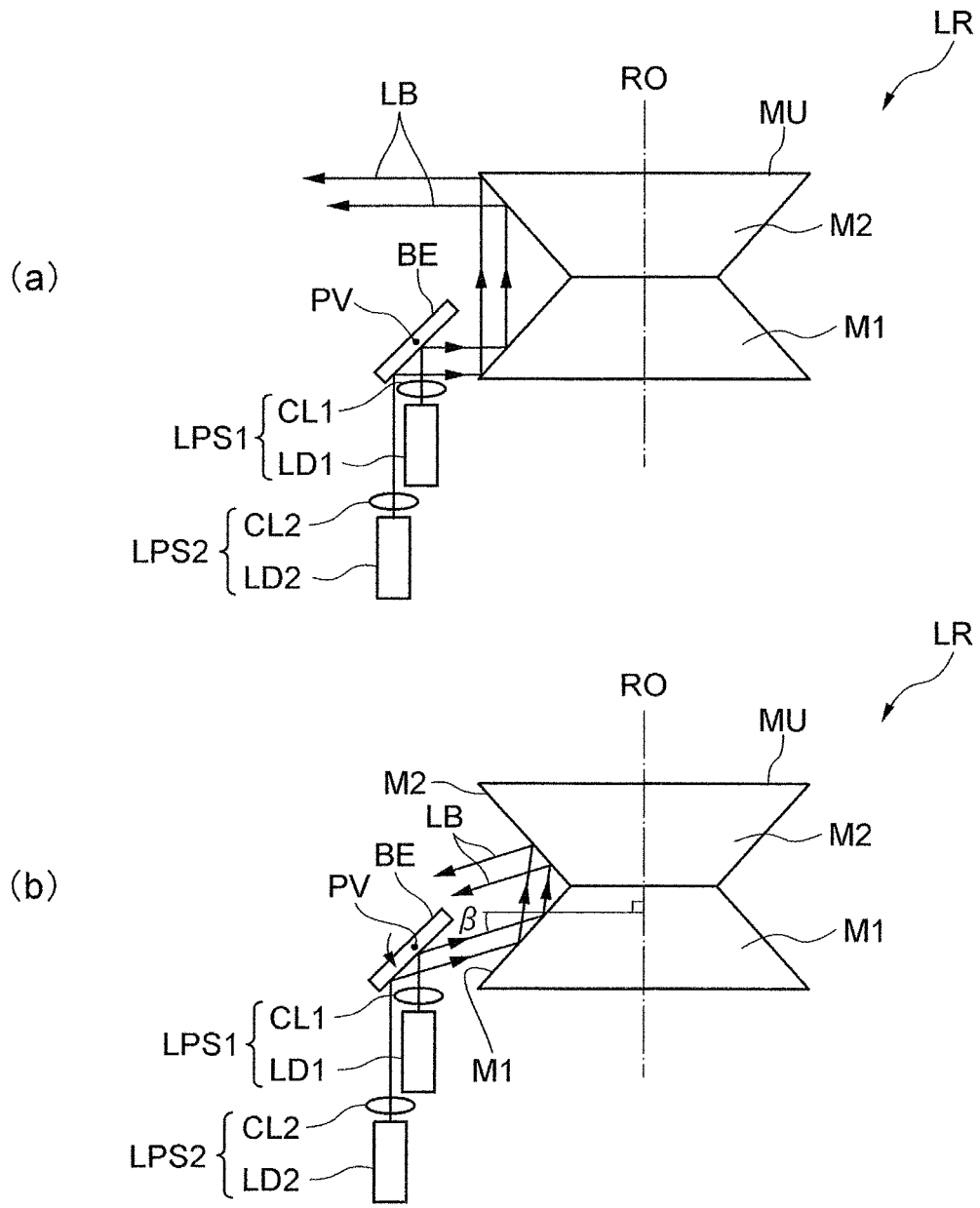
FIG. 19 is a cross sectional view showing a modification embodiment of a scanning optical system according to the present embodiment.

FIG. 19 is a cross sectional view showing a modification embodiment of the present embodiment. In the modification embodiment shown in FIG. 19, all the respective intersection angles of a plurality of pairs of the first mirror surface M1 and the second mirror surface M2 in the mirror unit MU are constant (90 degrees). Moreover, two light fluxes LB from the light projecting systems LPS1 and LPS2 are reflected with a reflecting mirror BE used as an example of a deflecting element, reflected by the first mirror surface M1, and then, reflected by the second mirror surface M2. The reflecting mirror BE is made rotatable around an axis line PV extending in a direction vertical to a sheet surface.

Figure 20:
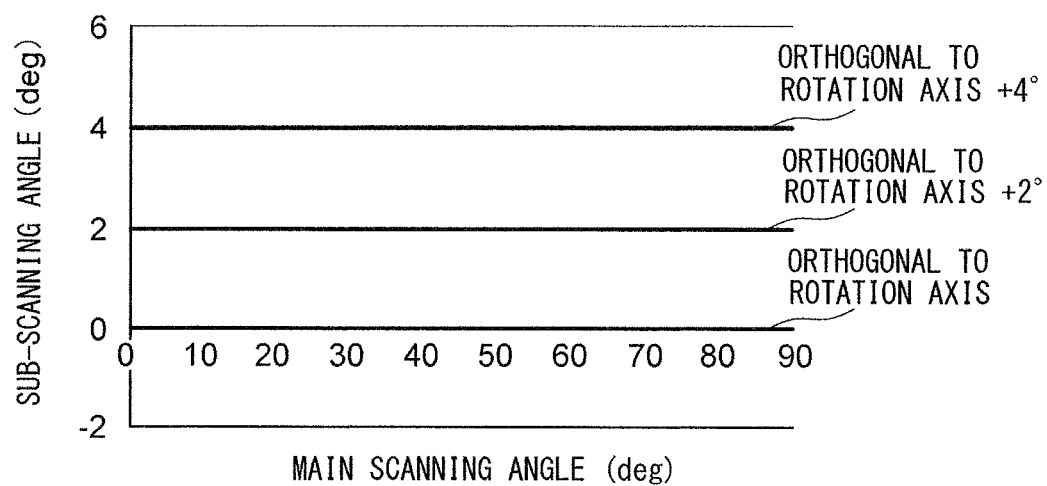
FIG. 20 is a diagram showing a relationship between a main scanning angle and longitudinal distortion in a scanning optical system in the modification embodiment.

As is clear from a comparison between FIGS. 19(a) and 19(b), in the case where the reflecting mirror BE as a deflecting element is rotated around the axis line PV for each time when each pair of the first mirror surface M1 and the second mirror surface M2 passes, an incident angle • of each of the two light fluxes LB reflected from the reflecting mirror BE to the first mirror surface M1 changes (in FIG. 19(a), •=0). Namely, in the case where the reflecting mirror BE is made to rotate around the axis line PV for each time when each pair of the first mirror surface M1 and the second mirror surface M2 passes, the direction of each of the two light fluxes LB reflected from the first mirror surface M1 changes, and further, the direction of each of the two light fluxes LB reflected from the second mirror surface M2 changes in the sub-scanning angle direction. Accordingly, similarly to the above-mentioned embodiment, there is an effect capable of performing scanning in the sub-scanning direction. FIG. 20 is a diagram showing a relationship between a main scanning angle and longitudinal distortion in the case of changing an incident angle to the first mirror surface M1 by using the reflecting mirror BE ((orthogonal to the rotation axis), (orthogonal to the rotation axis)+2 degrees, and (orthogonal to the rotation axis)+4 degrees) in a state where an intersection angle between the first mirror surface M1 and the second mirror surface M2 is 90 degrees in the scanning optical system shown in FIG. 19. From FIG. 20, it turns out that longitudinal distortion does not change on the center and periphery of the main scanning angle. Herein, the deflecting element should not be limited to the reflecting mirror, and an acousto-optical device or a MEMS mirror may be used as the deflecting element. Furthermore, in the case where a single light projecting system is used and a birefringent element (for example, calcite) as a deflecting element is disposed fixedly between the light projecting system and the first mirror surface, a light flux can be separated into a plurality of light fluxes. In this case, a plurality of spot lights can be formed with a single light source.

According to one aspect of the present invention, a mirror unit includes a plurality of pairs of the first mirror surface and the second mirror surface, and the intersection angle between the first mirror surface and the second mirror surface in each pair is different from those in the other pairs. Since the intersection angle between the first mirror surface and the second mirror surface is made different among the plurality of pairs, it becomes possible to perform scanning not only one line, but also a plurality of lines displaced in the sub-scanning direction, whereby it becomes possible to project a light flux to a wide range. Moreover, since the mirror unit can make a main scanning angle larger than a rotation angle, a rotation angle required for a single mirror unit for scanning cam be made small than the conventional method. Accordingly, it become possible to increase the number of scanning lines different in sub-scanning angle. By simply rotating such a mirror unit, it become possible to scan more than the all angle (full angle) of 180 degrees in the direction orthogonal to the rotation axis, and to project a light flux to different scanning lines different in the sub-scanning direction. In the case where it is not necessary to cover a main scanning direction widely, it becomes possible to increase the number of scanning lines in the sub-scanning direction by increasing the number of pairs of the first mirror surface and the second mirror surface. With this, by rotating the mirror unit only one rotation, it becomes possible to project a light flux to a wide range.

According to one aspect of the present invention, a mirror unit includes a plurality of pairs of the first mirror surface and the second mirror surface, and the plurality of pairs include at least two pairs which have the same intersection angle between the first mirror surface and the second mirror surface and at least one pair which has an intersection angle different from that in at least the two pairs. With this, a frame rate etc. can be improved. For example, in the case of using in a vehicle, an environment between a self-vehicle and other vehicles changes quickly. Accordingly, a frame rate becomes more important than a viewing angle. For example, consideration is given to a case where the number of pairs of the first mirror surface and the second mirror surface is four. In the case where these pairs are constituted such that the first pair and the third pair (opposite surfaces) are provide with the same first intersection angle and the second pair and the fourth pair (opposite surfaces) are provide with the same second intersection angle (different from the first intersection angle), a viewing field in the rotation axis direction can be secured, and in addition, a frame rate also can be partially improved. Moreover, consideration is given to a case where the number of pairs of the first mirror surface and the second mirror surface is three. In the case where these pairs are constituted such that the first pair and the second pair are provide with the same first intersection angle and the third pair is provided with a second intersection angle different from the first constituting angle, this constitution is suitable to detect white lines and a center line on a road surface for which a frame rate is not required so much.

According to one aspect of the present invention, there is provided a deflecting element to change the proceeding direction of a light flux emitted from the light source between the light source and the mirror unit. As described by using FIGS. 13 and 14, as an intersection angle between the first mirror surface and the second mirror surface of the mirror unit separates more from 90 degrees, longitudinal distortion and a spot rotation angle become larger. Then, the incident angle of a light flux to the mirror unit is changed in the sub-scanning direction by using the deflecting element as shown in FIG. 17, whereby it becomes possible to shift a scanning line to the sub-scanning direction while using a mirror pair with an intersection angle near to 90 degrees with which the longitudinal distortion and the spot rotation angle can be suppressed. Moreover, a deviation of the incident angle of a light flux to the mirror unit influences the sub-scanning angle. Accordingly, in the case where the whole light projecting system inclines, or at the time of correcting the initial position of a radar, the deflecting element may be used for correcting an incident angle in the sub-scanning direction.

According to one aspect of the present invention, a plurality of light sources are disposed, and each of light fluxes emitted from the light sources becomes, at the time of entering an object, a spot light flux. With this, after being reflected on the second mirror, a plurality of spot lights can be arranged in the direction intersecting with the main scanning direction. Accordingly, the intensity of each spot light flux is made higher, and an object can be measured easily. Furthermore, a light emitting timing can be changed for each of the light sources. Accordingly, for example, a light flux is not emitted for a range to where there is no need to project a light flux, and a light source is deactivated, whereby it becomes possible to prolong the lifetime of the light source.

According to one aspect of the present invention, the light projecting and receiving apparatus includes a scanning optical system and a light receiving system equipped with a light receiving element to receive a reflected light flux reflected from an object. It is desirable that such a light receiving system reflects a reflected light flux reflected from an object by a second mirror surface, further reflects it by a first mirror surface, and thereafter receives the light flux with a light receiving element. This constitution can be used as a laser radar.

It is also possible to project a light flux to a wide range equal to or more that the full angle of 180 degrees with the light projecting system and the mirror unit. However, it is difficult to receive a reflected light flux from an object directly with a light receiving element being a two-dimensional sensor (CMOS, CCD) via a lens, because a required object side opening diameter cannot obtained. Moreover, even if the reflected light flux can be received, there is a fear that resolving power may change between the center and periphery of the main scanning due to distortion by using a lens with a large diameter. Then, as shown in FIG. 15, in the case where the light receiving system RPS reflects a reflected light flux reflected from an object by the second mirror surface M2, further reflects it by the first mirror surface M1, and thereafter, receives the light flux with the light receiving element PD, the scanning range can be made wide also in the light receiving similarly to the light projecting. As a result, for example, the light receiving system RPS also can obtain the effects of a low spot rotation angle and low longitudinal distortion of the mirror unit MU in a range of the full main scanning angle of 180 degrees. Moreover, it is also possible to enlarge the opening of the light receiving system RPS. It is an ideal that the respective optical axes of the light receiving system RPS and the light projecting system LPS are parallel to each other. However, a light flux may be received by displacing the optical axis with a lens or a free curved surface mirror.

Moreover, in the scanning with a reflective mirror to reflect a light flux one time, in the case where a light receiving system is configured to be arranged so as to receive a light flux after being reflected by a scanning reflective mirror, there is a possibility that the optical surface of the light receiving system is exposed directly to sunlight. In that case, there is a fear that noise may increase and S/N may get worse due to stray light rays in the light receiving optical system. In contrast, in the case where the light receiving system of the mirror unit is arranged in parallel to the light projecting system so as to receive a light flux after being reflected by a mirror, the light receiving system can receive only a light flux reflected by a mirror without entering of sunlight. According to such an arrangement, in the case of a light flux which hit upon a scanning reflective mirror, S/N does not always get worse. Only in the case where a light flux reflected by a mirror enters the light receiving system, S/N gets worse. Accordingly, as compared with the scanning system with a single mirror, it is possible to improve a fear that S/N gets worse due to the influence of a scanning range in every directions and sunlight.

It is clear for a person skilled in the art from the embodiments written in this specification and a technical concept that the present invention should not be limited to the embodiments written in this specification, and includes other embodiments and modification embodiments. The descriptions and the embodiments of this specification are aimed to show exemplification only, and the scope of the present invention is shown with claims mentioned later. For example, the contents of the present invention described with the drawings can be applied to all the embodiments. For example, a light source should not be limited to laser. For example, a light source using LED may be employed.

REFERENCE SIGNS LIST

BE Reflective mirror
CL, CL1 to CL3 Collimator lens
LB Laser light flux
LD, LD1 to LD3 Semiconductor laser
LPS, LPS1 to LPS3 Light projecting system
LR Laser radar
LS Lens
M1 First mirror surface
M2 Second mirror surface
MU Mirror unit
OPS Light source
PD Photo diode
PV Axis line
RM1 Reflective surface
RO Rotation axis
RPS Light receiving system
SL Spot light flux
SO Optical axis
SR Scanning surface

The invention claimed is:
1. A light projecting and receiving apparatus, comprising:
a scanning optical system, comprising a mirror unit equipped with a first mirror surface and a second mirror surface each of which inclines to a rotation axis, and a light projecting system including at least one light source to emit a light flux toward the first mirror surface; and
a light receiving system equipped with a plurality of light receiving elements which receive a reflected light flux reflected from the object,
wherein a light flux emitted from the light source is reflected on the first mirror surface of the mirror unit, thereafter, reflected on the second mirror surface, and then, projected so as to scan in a main scanning direction onto an object in accordance with rotation of the mirror unit,
wherein the light flux emitted from the second mirror surface becomes a plurality of spot lights on the object side, and the plurality of spot lights are arranged along a direction intersecting with the main scanning direction,
wherein optical axes of the light receiving system and the light projecting system are parallel to each other, and wherein the plurality of light receiving elements are arranged in a direction intersecting to the main scanning direction.

2. The light projecting and receiving apparatus of claim 1, wherein the mirror unit includes a plurality of pairs of the first mirror surface and the second mirror surface, and an intersection angle between the first mirror surface and the second mirror surface in each pair is different from respective intersection angles of the other pairs.

3. The light projecting and receiving apparatus of claim 1, wherein the mirror unit includes a plurality of pairs of the first mirror surface and the second mirror surface, and the plurality of pairs includes at least two pairs which have the same intersection angle between the first mirror surface and the second mirror surface and at least one pair which has an intersection angle different from the intersection angle of the two pairs.

4. The light projecting and receiving apparatus of claim 1, further comprising:

a deflecting element which is disposed between the light source and the mirror unit and changes a proceeding direction of a light flux emitted from the light source.

5. The light projecting and receiving apparatus of claim 1, wherein the light source includes a plurality of light sources, and each of light fluxes emitted from the light sources becomes, when entering the object, the spot light flux.

6. The light projecting and receiving apparatus of claim 1, wherein the light receiving system reflects the reflected light flux reflected from the object by the second mirror surface, further reflects the reflected light flux by the first mirror surface, and thereafter, receives the reflected light flux with the plurality of light receiving elements.

7. The light projecting and receiving apparatus of claim 1, wherein no image-forming lens is included between the second mirror surface and the object.

* * * * *